(12) United States Patent  (10) Patent No.: US 8,363,198 B2
Lee et al.  (45) Date of Patent: Jan. 29, 2013

(54) LIQUID CRYSTAL DISPLAY DEVICE

(75) Inventors: Ju-Young Lee, Gumi-si (KR); Jong-Tae Kim, Gumi-si (KR); Woo-Kyu Sang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 373 days.

(21) Appl. No.: 12/654,732

(22) Filed: Dec. 30, 2009

(65) Prior Publication Data

US 2010/0302494 A1 Dec. 2, 2010

(30) Foreign Application Priority Data

May 29, 2009 (KR) ........................ 10-2009-0047454

(51) Int. Cl.
*G02F 1/1345* (2006.01)
(52) U.S. Cl. ...................................................... 349/150
(58) Field of Classification Search ................... 349/150
See application file for complete search history.

(56) References Cited

U.S. PATENT DOCUMENTS 6,388,722 B1 * 5/2002 Yoshii et al. .................... 349/62

FOREIGN PATENT DOCUMENTS

CN 101266762 A 9/2008

* cited by examiner

*Primary Examiner* — Timothy L Rude
(74) *Attorney, Agent, or Firm* — McKenna Long & Aldridge, LLP (57) ABSTRACT

Liquid crystal display device for saving a cost and minimizing spatial and mechanical limitations. The liquid crystal display device includes a liquid crystal display panel for displaying a picture, a plurality of data drive integrated circuits connected between one side of the liquid crystal display panel and a source printed circuit board, and a flexible flat cable connecting user connector formed at one side of the source printed circuit board for receiving a data signal and various control signals from a system.

3 Claims, 6 Drawing Sheets

LIQUID CRYSTAL DISPLAY DEVICE

CROSS REFERENCE TO RELATED APPLICATION

This application claims the benefit of the Korean Patent Application No. 10-2009-0047454 filed on May 29, 2009, which is hereby incorporated by reference as if fully set forth herein.

BACKGROUND OF THE DISCLOSURE

1. Field of the Disclosure

The present invention relates to liquid crystal display devices, and, more particularly, to a liquid crystal display device in which a harness cable connecting user connector is replaced with a flexible flat cable connecting user connector for saving a cost and minimizing spatial and mechanical limitations.

2. Discussion of the Related Art

In general, the liquid crystal display device displays a picture by controlling a light transmissivity of liquid crystals by using an electric field. For this, the liquid crystal display device is provided with a liquid crystal display panel having a matrix of pixel regions, and a drive circuit for driving the liquid crystal display panel.

The liquid crystal display panel has a plurality of gate lines and a plurality of data lines arranged perpendicular to each other, and a pixel region positioned at every region defined as the gate lines and the data lines cross. Pixel electrodes and a common electrode are formed at the liquid crystal display panel for applying the electric field to the pixel regions.

The data lines at the liquid crystal display panel are driven by a plurality of data drive integrated circuits, which has data signals and various control signals supplied thereto through a timing controller. The timing controller is formed on a data printed circuit board which has a user connector formed thereto for receiving the data signals and the various control signals from a system. The user connector is a harness cable connecting connector for connection to a system connector at the system through a harness cable. The system connector is also a harness cable connecting connector.

However, the harness cable connecting connector is expensive and a great height to occupy much space. Moreover, the harness cable used in the related art is thick and has no flexibility imposing much mechanical limitation in using for the liquid crystal display device.

SUMMARY OF THE DISCLOSURE

Accordingly, the present invention is directed to a liquid crystal display device.

An object of the present invention is to provide a liquid crystal display device in which a harness cable connecting user connector used presently is replaced with a flexible flat cable connecting user connector for saving a cost and minimizing spatial and mechanical limitations.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device includes a liquid crystal display panel for displaying a picture, a plurality of data drive integrated circuits connected between one side of the liquid crystal display panel and a source printed circuit board, and a flexible flat cable connecting user connector formed at one side of the source printed circuit board for receiving a data signal and various control signals from a system.

The liquid crystal display device further includes a timing controller for timely forwarding of the data signal and the various control signals from the system, wherein the timing controller is formed at the source printed circuit board.

The liquid crystal display device further includes an interchanging unit having a flexible flat cable connecting first connector and a harness cable connecting second connector formed thereon, and a flexible flat cable having one side connected to the user connector of the source printed circuit board and the other side connected to a first connector of the interchanging unit, wherein the first and second connectors of the interchanging unit are electrically connected to each other, and the second connector of the interchanging unit receives a data signal and various control signals from the system through the harness cable.

The liquid crystal display device further includes a timing controller for timely forwarding of the data signal and the various control signals from the system, wherein the timing controller is formed at one of the source printed circuit board and the interchanging unit.

In another aspect of the present invention, a liquid crystal display device includes a liquid crystal display panel for displaying a picture, a plurality of data drive integrated circuits connected between one side of the liquid crystal display panel and a source printed circuit board, a control printed circuit board connected to the source printed circuit board SP through a connection portion, and a flexible flat cable connecting user connector formed at one side of the control printed circuit board for receiving a data signal and various control signals from a system.

The liquid crystal display device further includes a timing controller for timely forwarding of the data signal and the various control signals from the system, wherein the timing controller is formed at one of the source printed circuit board and the control printed circuit board.

The liquid crystal display device further includes an interchanging unit having a flexible flat cable connecting first connector and a harness cable connecting second connector formed thereon, and a flexible flat cable having one side connected to the user connector of the control printed circuit board and the other side connected to the first connector of the interchanging unit, wherein the first and second connectors of the interchanging unit are electrically connected to each other, and the second connector of the interchanging unit receives the data signal and the various control signals from the system through the harness cable.

The liquid crystal display device further includes a timing controller for timely forwarding of the data signal and the various control signals from the system, wherein the timing controller is formed at one of the source printed circuit board, the control circuit board, and the interchanging unit.

The connection portion is a flexible flat cable.

In another aspect of the present invention, a liquid crystal display device includes a liquid crystal display panel having a first display unit and a second display unit, a plurality of first data drive integrated circuits connected between one side of the liquid crystal display panel and a first source printed circuit board for driving data lines at the first display unit, a plurality of second data drive integrated circuits connected between one side of the liquid crystal display panel and a second source printed circuit board for driving data lines at the second display unit, a control printed circuit board connected to the first source printed circuit board through a first connection portion and the second source printed circuit board through a second connection portion, and a flexible flat cable connecting user connector formed at one side of the control printed circuit board for receiving a data signal and various control signals from a system.

The liquid crystal display device further includes a timing controller for timely forwarding of the data signal and the various control signals from the system, wherein the timing controller is formed at one of the first source printed circuit board, the second source printed circuit board, and the control circuit board.

The liquid crystal display device further includes an interchanging unit having a flexible flat cable connecting first connector and a harness cable connecting second connector formed thereon, and a flexible flat cable having one side connected to the user connector of the control printed circuit board and the other side connected to the first connector of the interchanging unit, wherein the first connector and the second connector of the interchanging unit are connected to each other electrically, and the second connector of the interchanging unit receives the data signal and the various control signals from the system through a harness cable.

The liquid crystal display device further includes a timing controller for timely forwarding of the data signal and the various control signals from the system, wherein the timing controller is formed at one of the first source printed circuit board, the second source printed circuit board, the control circuit board and the interchanging unit.

The first and second connection portions are flexible flat cables.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Figure 1:
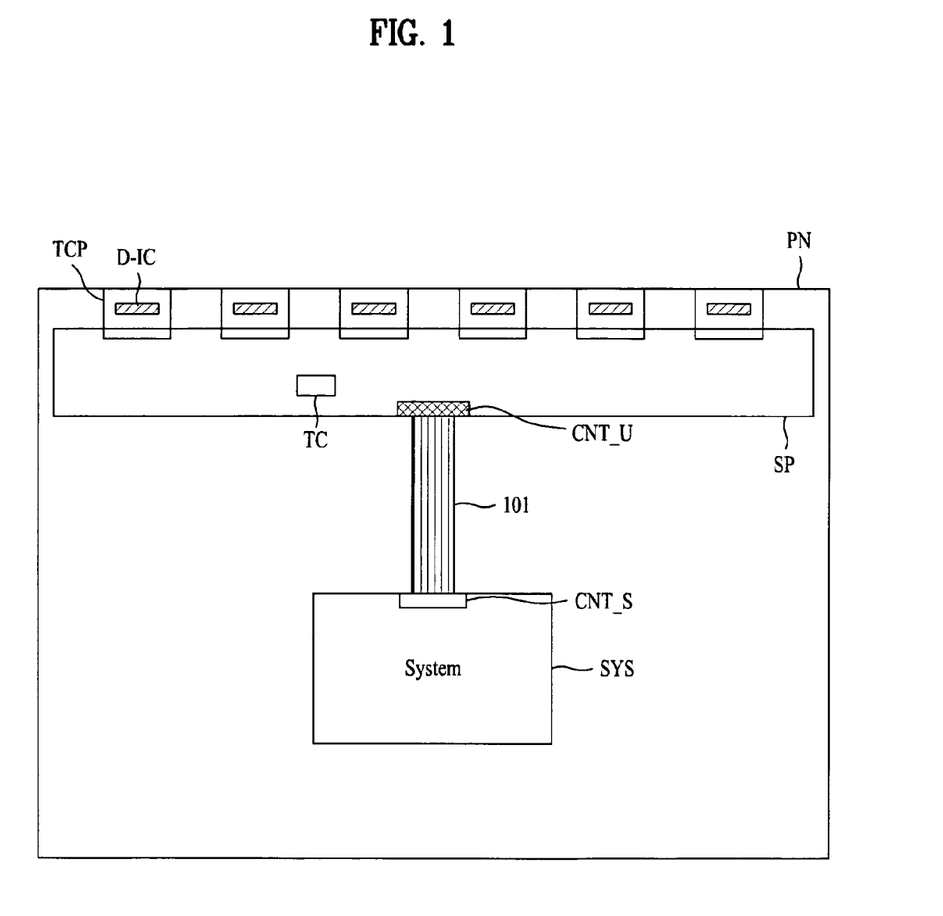
FIG. 1 illustrates a diagram of a liquid crystal display device in accordance with a first preferred embodiment of the present invention.

FIG. 1 illustrates a diagram of a liquid crystal display device in accordance with a first preferred embodiment of the present invention.

Referring to FIG. 1, the liquid crystal display device includes a liquid crystal display panel PN for displaying a picture, a plurality of data drive integrated circuits D-IC connected between one side of the liquid crystal display panel PN and a source printed circuit board SP, a flexible flat cable connecting user connector CNT_U formed at one side of the source printed circuit board SP for receiving a data signal and various control signals from a system SYS.

The flexible flat cable connecting user connector CNT_U is a connector having a plurality of connection pins for connecting a flexible flat cable 101.

The system SYS includes a system connector CNT_S for forwarding the data signal and various control signals. The system connector CNT_S is also a flexible flat cable connecting connector, and the system connector CNT_S and the user connector CNT_U are connected to each other through the flexible flat cable 101. That is, the flexible flat cable 101 has one side connected to the user connector CNT_U, and the other side connected to the system connector CNT_S.

Each of the data drive integrated circuits D-IC is connected between one of source printed circuit board SP and the liquid crystal display panel PN in a state the data drive integrated circuit D-IC is mounted to a tape carrier package TCP.

In the meantime, though not shown, the liquid crystal display device also includes a plurality of gate lines arranged in the liquid crystal display panel PN to cross the data lines. Moreover, the liquid crystal display device also includes a plurality of gate drive integrated circuits for driving the gate lines.

The source printed circuit board SP has a timing controller TC mounted thereto. The timing controller TC generates a data control signal and a gate control signal by using a horizontal synchronizing signal Hsync, a vertical synchronizing signal Vsync, and a clock signal CLK supplied from the system, and supplies the data control signal and the gate control signal generated thus to the plurality of data drive integrated circuits D-IC and the plurality of gate drive integrated circuits. The data control signal DCS includes a dot clock, a source shift clock, a source enable signal, and a polarity inversion signal. The gate control signal GCS includes a gate start pulse, a gate shift clock, and a gate output enable signal and provided to a gate driver GD.

The data drive integrated circuits D-IC sample data according to the data control signal DCS from the timing controller TC and latch one line portion of the data sampled thus at every horizontal time 1H, 2H, - - - and supplies the data latched thus to the data lines DL. That is, the data drive integrated circuits D-IC converts the data from the timing controller TC into an analog pixel signal by using a gamma voltage GMA1~6 from a gamma voltage generating unit and supplies the analog pixel signal converted thus to the data lines.

The gate drive integrated circuit includes a shift register for generating a scan pulse in succession in response to the gate start pulse in the gate control signals from the timing controller TC, and a level shifter for shifting a voltage of the scan pulse to a voltage level suitable for driving liquid crystal cells. The gate drive integrated circuit supplies a gate high voltage to the gate lines in succession in response to the gate control signals GSC.

FIG. 1 illustrates a back side of the liquid crystal display device showing no display portion of the liquid crystal display panel PN.

In the first preferred embodiment of the present invention, by replacing a harness cable connecting user connector with the flexible flat cable connecting user connector CNT-U, the system SYS and the user connector CNT_U can be connected by using the flexible flat cable 101 instead of the harness cable.

Figure 2:
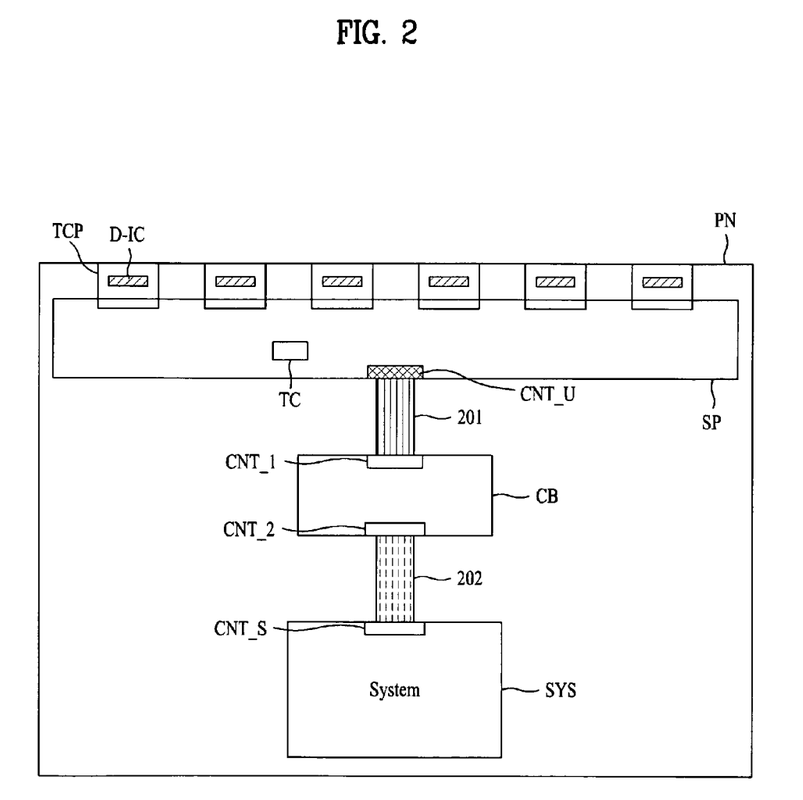
FIG. 2 illustrates a diagram of a liquid crystal display device in accordance with a second preferred embodiment of the present invention.

FIG. 2 illustrates a diagram of a liquid crystal display device in accordance with a second preferred embodiment of the present invention.

Referring to FIG. 2, the liquid crystal display device includes a liquid crystal display panel PN for displaying a picture, a plurality of data drive integrated circuits D-IC connected between one side of the liquid crystal display panel PN and a source printed circuit board SP, a flexible flat cable connecting user connector CNT_U formed at one side of the source printed circuit board SP for receiving a data signal and various control signals from a system SYS, an interchanging unit CB having a flexible flat cable connecting first connector CNT_1 and a harness cable connecting second connector CNT_2 formed thereon, and a flexible flat cable 201 having one side connected to the user connector CNT_U of the source printed circuit board SP and the other side connected to the first connector CNT_1 of the interchanging unit CB.

In the interchanging unit CB, the first connector CNT_1 and the second connector CNT_2 are connected to each other electrically, and the second connector CNT_2 of the interchanging unit CB receives the data signal and the various control signals from the system SYS through the harness cable 202. That is, the harness cable 202 has one side connected to the second connector CNT_2 of the interchanging unit CB and the other side connected to the system connector CNT_S. In the second embodiment of the present invention, the system connector CNT_S is a harness cable connecting connector.

When it is intended to connect the system SYS having a related art harness cable connecting system connector CNT_S to the user connector CNT_U (flexible flat cable connecting user connector CNT_U) of the source printed circuit board SP of the embodiment, the interchanging unit CB is used as an adaptor for connecting the connectors of different types to each other.

The liquid crystal display device in accordance with the second preferred embodiment of the present invention also includes the timing controller TC. The timing controller TC can be formed at one of the source printed circuit board SP and the interchanging unit CB. FIG. 2 illustrates the timing controller TC formed at the source printed circuit board SP.

In the meantime, though not shown, the liquid crystal display device in accordance with the second preferred embodiment of the present invention also includes the gate drive integrated circuit. Since the gate drive integrated circuit and the data drive integrated circuit D-IC are identical to the same of the first embodiment, detailed description of which will be omitted.

Figure 3:
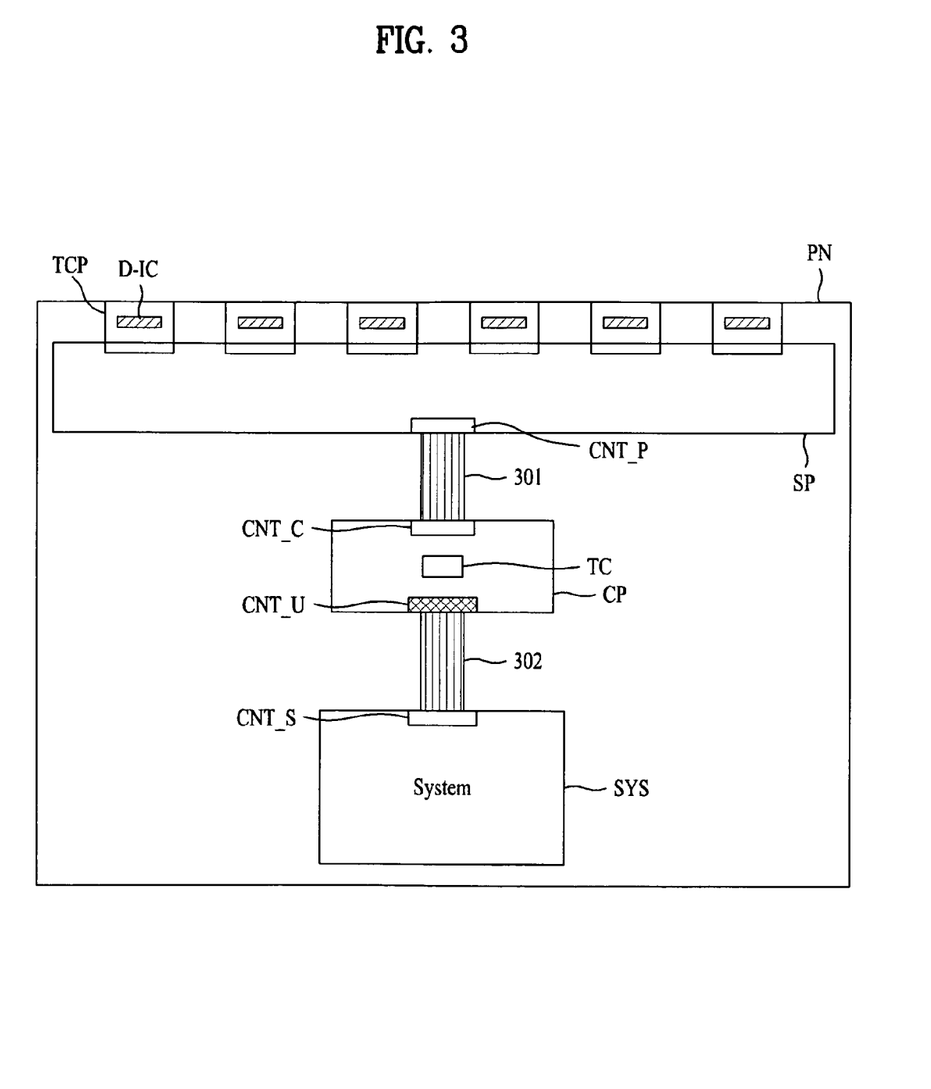
FIG. 3 illustrates a diagram of a liquid crystal display device in accordance with a third preferred embodiment of the present invention.

FIG. 3 illustrates a diagram of a liquid crystal display device in accordance with a third preferred embodiment of the present invention.

Referring to FIG. 3, the liquid crystal display device includes a liquid crystal display panel PN for displaying a picture, a plurality of data drive integrated circuits D-IC connected between one side of the liquid crystal display panel PN and a source printed circuit board SP, a control printed circuit board CP connected to the source printed circuit board SP through a connection portion 301, and a flexible flat cable connecting user connector CNT_U formed at one side of the control printed circuit board CP for receiving a data signal and various control signals from a system SYS.

Both of the source connector CNT_P of the source printed circuit board SP and the control connector CNT_C of the control printed circuit board CP are flexible flat cable connecting connectors, and the source connector CNT_P and the control connector CNT_C are connected to each other with the connection portion 301. The connection portion 301 may be a flexible flat cable having one side connected to the source connector CNT_P and the other side connected to the control connector CNT_C.

The user connector CNT_U formed at one side of the control printed circuit board CP is connected to the system connector CNT_S of the system SYS through a flexible flat cable 302.

The liquid crystal display device in accordance with the third preferred embodiment of the present invention also includes the timing controller TC. The timing controller TC can be formed at one of the source printed circuit board SP and the control printed circuit board CP. FIG. 3 illustrates the timing controller TC formed at the control printed circuit board CP.

In the meantime, though not shown, the liquid crystal display device in accordance with the third preferred embodiment of the present invention also includes the gate drive integrated circuit. Since the gate drive integrated circuit and the data drive integrated circuit D-IC are identical to the same of the first embodiment, detailed description of which will be omitted.

Figure 4:
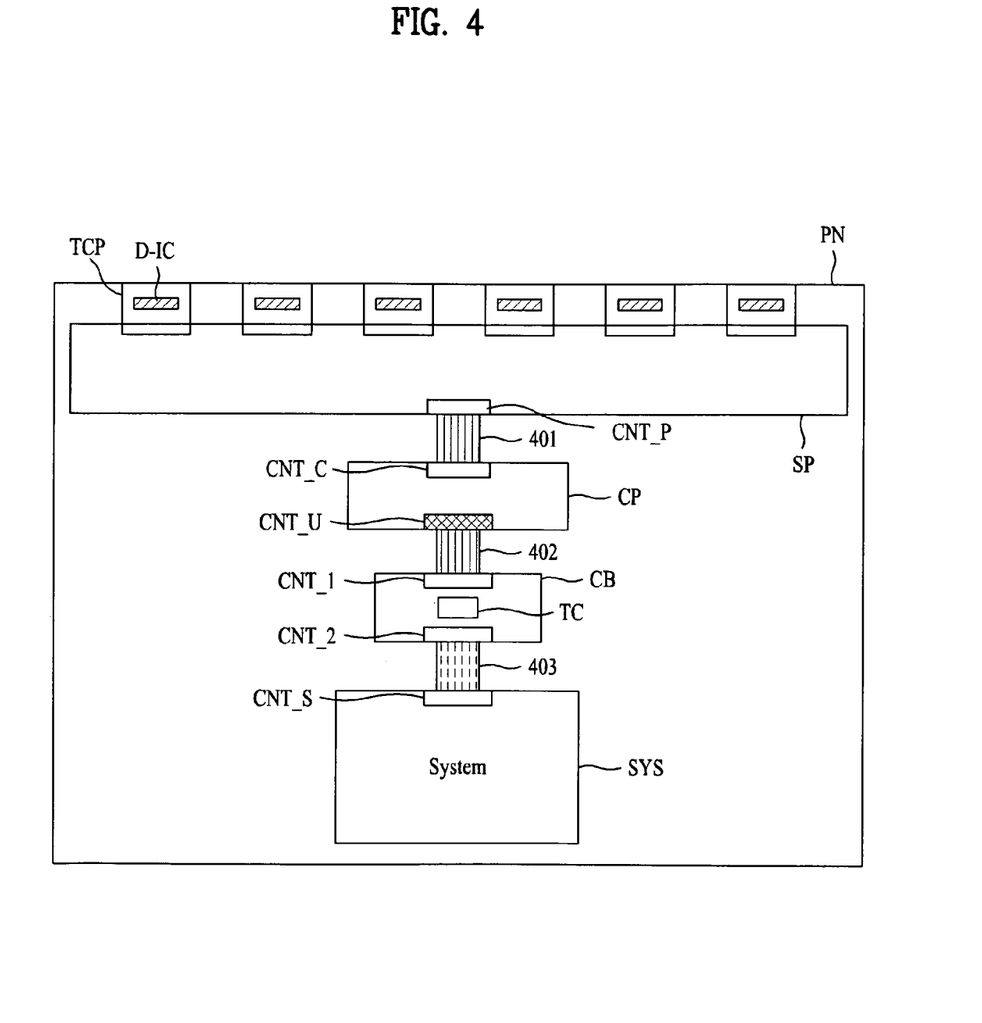
FIG. 4 illustrates a diagram of a liquid crystal display device in accordance with a fourth preferred embodiment of the present invention.

FIG. 4 illustrates a diagram of a liquid crystal display device in accordance with a fourth preferred embodiment of the present invention.

Referring to FIG. 4, the liquid crystal display device includes a liquid crystal display panel PN for displaying a picture, a plurality of data drive integrated circuits D-IC connected between one side of the liquid crystal display panel PN and a source printed circuit board SP, a control printed circuit board CP connected to the source printed circuit board SP through a connection portion 401, a flexible flat cable connecting user connector CNT_U formed at one side of the control printed circuit board CP for receiving a data signal and various control signals from a system SYS, an interchanging unit CB having a flexible flat cable connecting first connector CNT_1 and a harness cable connecting second connector CNT_2 formed thereon, and a flexible flat cable 401 having one side connected to the user connector CNT_U of the control printed circuit board CP and the other side connected to the first connector CNT_1 of the interchanging unit CB.

In the interchanging unit CB, the first connector CNT_1 and the second connector CNT_2 are connected to each other electrically, and the second connector CNT_2 of the interchanging unit CB receives the data signal and the various control signals from the system SYS through the harness cable 403. That is, the harness cable 403 has one side connected to the second connector CNT_2 of the interchanging unit CB and the other side connected to the system connector CNT_S. In the fourth embodiment of the present invention, the system connector CNT_S is a harness cable connecting connector.

When it is intended to connect the system SYS having a related art harness cable connecting system connector CNT_S to the user connector CNT_U (flexible flat cable connecting user connector CNT_U) of the control printed circuit board CP of the embodiment, the interchanging unit CB is used as an adaptor for connecting the connectors of different types to each other.

Both of the source connector CNT_P of the source printed circuit board SP and the control connector CNT_C of the control printed circuit board CP are flexible flat cable connecting connectors, and the source connector CNT_P and the control connector CNT_C are connected to each other with the connection portion 401. The connection portion 401 has one side connected to the source connector CNT_P and the other side connected to the control connector CNT_C.

The liquid crystal display device in accordance with the fourth preferred embodiment of the present invention also includes the timing controller TC. The timing controller TC can be formed at one of the source printed circuit board SP the control printed circuit board CP and the interchanging unit CB. FIG. 4 illustrates the timing controller TC formed at the interchanging unit CB.

In the meantime, though not shown, the liquid crystal display device in accordance with the fourth preferred embodiment of the present invention also includes the gate drive integrated circuit. Since the gate drive integrated circuit and the data drive integrated circuit D-IC are identical to the same of the first embodiment, detailed description of which will be omitted.

Figure 5:
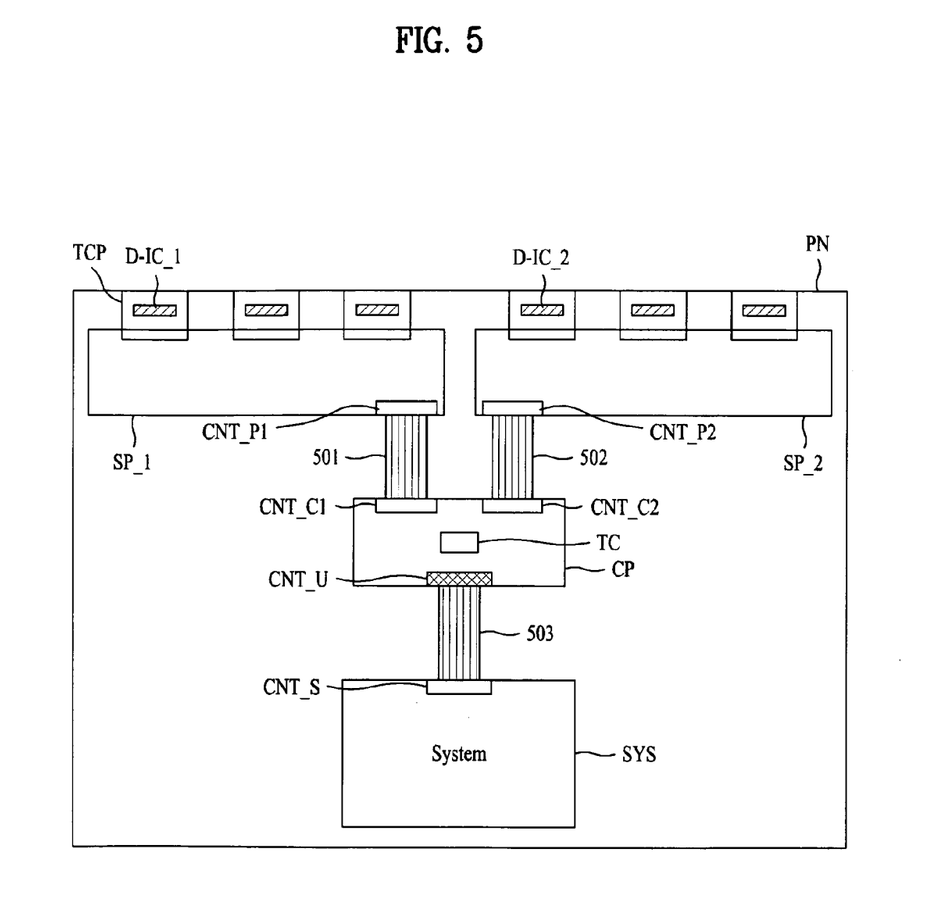
FIG. 5 illustrates a diagram of a liquid crystal display device in accordance with a fifth preferred embodiment of the present invention.

FIG. 5 illustrates a diagram of a liquid crystal display device in accordance with a fifth preferred embodiment of the present invention.

Referring to FIG. 5, the liquid crystal display device includes a liquid crystal display panel PN having a first display domain and a second display domain, a plurality of first data drive integrated circuits D-IC_1 connected between one side of the liquid crystal display panel PN and a first source printed circuit board SP_1 for driving data lines at the first display domain, a plurality of second data drive integrated circuits D-IC_2 connected between one side of the liquid crystal display panel PN and a second source printed circuit board SP_2 for driving data lines at the second display domain, a control printed circuit board CP connected to the first source printed circuit board SP_1 through a first connection portion 501 and the second source printed circuit board SP_2 through a second connection portion 502, and a flexible flat cable connecting user connector CNT_U formed at one side of the control printed circuit board CP for receiving a data signal and various control signals, from a system SYS.

The first data drive integrated circuits D-IC_1 supply data to the data lines positioned at the first display domain, and the second data drive integrated circuits D-IC_2 supply data to the data lines positioned at the second display domain.

All of the first source connector CNT_P1 of the first source printed circuit board SP_1, the second source connector CNT_P2 of the second source printed circuit board SP_2, and the first and second control connectors CNT_C1 and CNT_C2 of the control printed circuit board CP are flexible flat cable connecting connectors, and the first source connector CNT_P1 and the first control connector CNT_C1 are connected to each other with the connection portion 501, and the second source connector CNT_P2 and the second control connector CNT_C2 are connected to each other with the connection portion 502. The first and second connection portions 501 and 502 may be flexible flat cables. The first connection portion 501 has one side connected to the first source connector CNT_P1 and the other side connected to the first control connector CNT_C1. The second connection portion 502 has one side connected to the second source connector CNT_P2 and the other side connected to the second control connector CNT_C2.

The user connector CNT_U formed at one side of the control printed circuit board CP is connected to the system connector CNT_S of the system SYS through a flexible flat cable 503.

The liquid crystal display device in accordance with the fifth preferred embodiment of the present invention also includes the timing controller TC. The timing controller TC can be formed at one of the first source printed circuit board SP_1, the second source printed circuit board SP_2, and the control printed circuit board CP. FIG. 5 illustrates the timing controller TC formed at the control printed circuit board CP.

In the meantime, though not shown, the liquid crystal display device in accordance with the fifth preferred embodiment of the present invention also includes the gate drive integrated circuit. Since the gate drive integrated circuit and the data drive integrated circuit D-IC_1 and D-IC_2 are identical to the same of the first embodiment, detailed description of which will be omitted.

Figure 6:
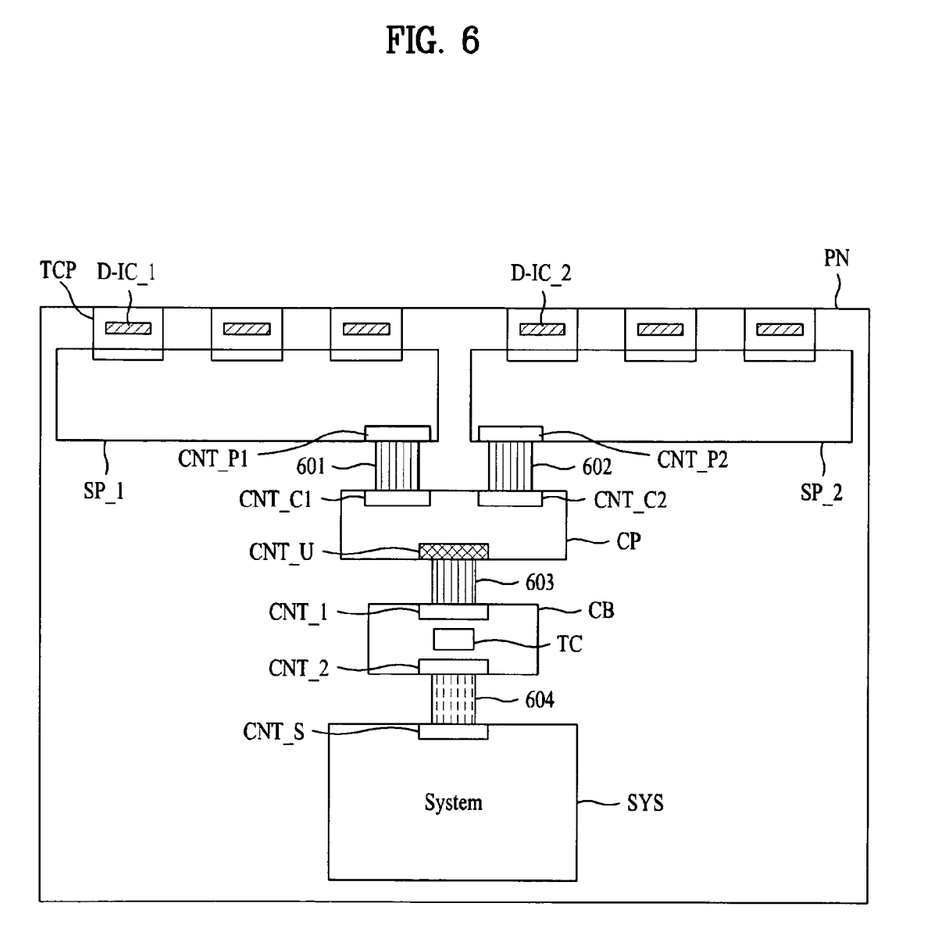
FIG. 6 illustrates a diagram of a liquid crystal display device in accordance with a sixth preferred embodiment of the present invention.

FIG. 6 illustrates a diagram of a liquid crystal display device in accordance with a sixth preferred embodiment of the present invention.

Referring to FIG. 6, the liquid crystal display device includes a liquid crystal display panel PN having a first display domain and a second display domain, a plurality of first data drive integrated circuits D-IC_1 connected between one side of the liquid crystal display panel PN and a first source printed circuit board SP_1 for driving data lines at the first display domain, a plurality of second data drive integrated circuits D-IC_2 connected between one side of the liquid crystal display panel PN and a second source printed circuit board SP_2 for driving data lines at the second display domain, a control printed circuit board CP connected to the first source printed circuit board SP_1 through a first connection portion 601 and the second source printed circuit board SP_2 through a second connection portion 602, a flexible flat cable connecting user connector CNT_U formed at one side of the control printed circuit board CP for receiving a data signal and various control signals from a system SYS, an interchanging unit CB having a flexible flat cable connecting first connector CNT_1 and a harness cable connecting second connector CNT_2 formed thereon, and a flexible flat cable 603 having one side connected to the user connector CNT_U of the control printed circuit board CP and the other side connected to the first connector CNT_1 of the interchanging unit CB.

In the interchanging unit CB, the first connector CNT_1 and the second connector CNT_2 are connected to each other electrically, and the second connector CNT_2 of the interchanging unit CB receives the data signal and the various control signals from the system SYS through a harness cable 604. That is, the harness cable 604 has one side connected to the second connector CNT_2 of the interchanging unit CB and the other side connected to the system connector CNT_S of the system SYS. In the fourth embodiment of the present invention, the system connector CNT_S is a harness cable connecting connector.

When it is intended to connect the system SYS having a related art harness cable connecting system connector CNT_S to the user connector CNT_U (flexible flat cable connecting user connector CNT_U) of the control printed circuit board CP of the embodiment, the interchanging unit CB is used as an adaptor for connecting the connectors of different types to each other.

All of the first source connector CNT_P1 of the first source printed circuit board SP_1, the second source connector CNT_P2 of the second source printed circuit board SP_2, and the first and second control connectors CNT_C1 and CNT_C2 of the control printed circuit board CP are flexible flat cable connecting connectors, and the first source connector CNT_P1 and the first control connector CNT_C1 are connected to each other with the connection portion 601, and the second source connector CNT_P2 and the second control connector CNT_C2 are connected to each other with the connection portion 602. The first and second connection portions 601 and 602 may be flexible flat cables. The first connection portion 601 has one side connected to the first source connector CNT_P1 and the other side connected to the first control connector CNT_C1. The second connection portion 602 has one side connected to the second source connector CNT_P2 and the other side connected to the second control connector CNT_C2.

The liquid crystal display device in accordance with the sixth preferred embodiment of the present invention also includes the timing controller TC. The timing controller TC can be formed at one of the first source printed circuit board SP_1, the second source printed circuit board SP_2, and the control printed circuit board CP and the interchanging unit CB. FIG. 6 illustrates the timing controller TC formed at the interchanging unit CB.

In the meantime, though not shown, the liquid crystal display device in accordance with the sixth preferred embodiment of the present invention also includes the gate drive integrated circuit. Since the gate drive integrated circuit and the data drive integrated circuit D-IC_1 and D-IC_2 are identical to the same of the first embodiment, detailed description of which will be omitted.

As has been described, the liquid crystal display device of the present invention has the following advantages.

By replacing the related art harness cable connecting user cable with the flexible flat cable connecting user connector, the system and the user connector are connected with the flexible flat cable.

According to this, cost of the related art harness cable can be saved, and spatial and mechanical limitations can be minimized.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
   a liquid crystal display panel having a first display domain and a second display domain;
   a plurality of first data drive integrated circuits connected between one side of the liquid crystal display panel and a first source printed circuit board for driving data lines at the first display domain;
   a plurality of second data drive integrated circuits connected between one side of the liquid crystal display panel and a second source printed circuit board for driving data lines at the second display domain;
   a control printed circuit board connected to the first source printed circuit board through a first connection portion and the second source printed circuit board through a second connection portion; and
   a flexible flat cable connecting user connector formed at one side of the control printed circuit board for receiving a data signal and various control signals from a system;
   an interchanging unit having a flexible flat cable connecting first connector and a harness cable connecting second connector formed thereon, wherein the interchanging unit is used as an adaptor for connecting connectors of different types to each other;
   a flexible flat cable having one side connected to the user connector of the control printed circuit board and the other side connected to the first connector of the interchanging unit;
   wherein the first connector and the second connector of the interchanging unit are connected to each other electrically; and
   wherein the second connector of the interchanging unit receives the data signal and the various control signals from the system through a harness cable.

2. The liquid crystal display device as claimed in claim 1, further comprising a timing controller for timely forwarding of the data signal and the various control signals from the system,
   wherein the timing controller is formed at one of the first source printed circuit board, the second source printed circuit board, the control circuit board and the interchanging unit.

3. The liquid crystal display device as claimed in claim 1, wherein the first and second connection portions are flexible flat cables.

* * * * *